US012683987B2

(12) United States Patent
Campbell, II

(10) Patent No.: US 12,683,987 B2
(45) Date of Patent: Jul. 14, 2026

(54) DYNAMIC NETWORK SECURITY FOR INDUSTRIAL SYSTEMS

(71) Applicant: ROCKWELL AUTOMATION TECHNOLOGIES, INC., Mayfield Heights, OH (US)

(72) Inventor: Ronald Lee Campbell, II, Seabrook, NH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 76 days.

(21) Appl. No.: 18/583,446

(22) Filed: Feb. 21, 2024

(65) Prior Publication Data

US 2025/0267153 A1 Aug. 21, 2025

(51) Int. Cl.
*H04L 9/40* (2022.01)
*H04L 29/06* (2006.01)

(52) U.S. Cl.
CPC ...... *H04L 63/1416* (2013.01); *H04L 63/1425* (2013.01); *H04L 63/1441* (2013.01)

(58) Field of Classification Search
CPC ............ H04L 63/1416; H04L 63/1425; H04L 63/1441; H04L 63/14; H04L 63/1408; H04L 63/1433; H04L 63/20
See application file for complete search history.

(56) References Cited

U.S. PATENT DOCUMENTS

| | | | | |
|---|---|---|---|---|
| 11,870,799 | B1 * | 1/2024 | Imrem ................... | H04L 63/102 |
| 2021/0081270 | A1 * | 3/2021 | Abbaszadeh .......... | G06N 3/092 |
| 2022/0360597 | A1 * | 11/2022 | Fellows ................ | H04L 51/212 |

* cited by examiner

*Primary Examiner* — Edward Zee
(74) *Attorney, Agent, or Firm* — Quarles & Brady LLP

(57) ABSTRACT

Systems and methods for controlling network security within an industrial system. One method may include monitoring network traffic at a first industrial device of the industrial system. The method may include determining a first network security threat at the first industrial device using an artificial intelligence (AI) model trained to detect network security threats for the industrial system. The method may include controlling execution of a mitigation operation responsive to the network security threat.

17 Claims, 4 Drawing Sheets

400

405

MONITORING NETWORK TRAFFIC

410

DETECTING A NETWORK SECURITY THREAT BASED ON THE NETWORK TRAFFIC

415

CONTROLLING EXECUTION OF A MITIGATION OPERATION RESPONSIVE TO THE NETWORK SECURITY THREAT

DYNAMIC NETWORK SECURITY FOR INDUSTRIAL SYSTEMS

BACKGROUND

This disclosure relates to industrial environments and platforms such as industrial automation systems or manufacturing environments. Industrial manufacturing environments may include computing and mechanical systems configured to implement an industrial process. In industrial automation environments, control systems are used to drive various operations along an industrial line. Control programs are developed by programmers in integrated design applications. The integrated design applications may include programming tools to design control schemes for the industrial manufacturing environments. The control programs are used by control systems like Programmable Logic Controllers ("PLCs") to drive the industrial assets, devices, and sensors in an industrial process. The integrated design applications communicate with numerous systems within industrial manufacturing environments like PLCs and orchestration systems. Integrated design applications may also communicate with external systems. The numerous communication links may create security vulnerabilities in the integrated design applications.

The discussion above is merely provided for general background information and is not intended to be used as an aid in determining the scope of the claimed subject matter.

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to dynamic network security for industrial systems using, e.g., artificial intelligence ("AI") enabled Ethernet. In some examples, the technology disclosed herein provides an AI-powered cybersecurity solution by facilitating dynamic reactive network security for industrial systems.

As noted herein, industrial systems generally utilize control systems, executing a control scheme or program, to facilitate execution of an industrial process (e.g., to coordinate and control industrial assets, devices, sensors, etc. to perform at least a portion of the industrial process). Execution of an industrial process may include communication between one or more internal components or systems of the industrial system, communication with external components or systems of the industrial system, or a combination thereof. Accordingly, execution of an industrial process involves numerous communication links (including communication links internal to the industrial system and communication links external to the industrial system). The numerous communication links may create security vulnerabilities.

In the field of networking and cybersecurity, AI enabled Ethernet may be introduced as an approach to enhancing network security by incorporating AI directly into Ethernet/IP enabled devices. AI enabled Ethernet may allow such enabled devices to autonomously learn or adapt to network traffic patterns, thereby distinguishing between normal and abnormal network traffic. AI enabled Ethernet may address several needs and problems in the field of networking and cybersecurity, including, e.g., adaptive network security, real-time (or near real-time) threat detection, automated threat mitigation, efficient network-wide protection, diagnosis, and alerting, etc.

The technology disclosed herein may solve the problem of static and slow-to-adapt network security by introducing AI capabilities that may enable autonomous, dynamic, and efficient threat detection and mitigation. The technology disclosed herein addresses the need for more advanced and adaptable network security solutions in an increasingly complex and ever-changing cybersecurity landscape.

For example, the technology disclosed herein may leverage AI, machine learning (ML), or a combination thereof to enhance network security. In some configurations, the technology disclosed herein may monitor network traffic for an industrial system, detect abnormal network traffic patterns, and respond to potential threat. In some instances, the technology disclosed herein may continuously monitor network traffic. The technology disclosed herein may proactively respond to a potential threat in, e.g., real-time (or near real-time). The technology disclosed herein may advantageously provide, e.g., adaptive threat detection, automated response mechanisms, collaborative threat intelligence sharing among network devices, etc. Alternative or additional advantages may be facilitated by the technology disclosed herein. The technology disclosed herein may provide robust protection against evolving cyber threats, which may ensure or improve the integrity and resilience of networked systems and data.

Accordingly, the technology disclosed herein provides a technical solution to the technical problems stemming from the persistent and ever-evolving challenges in the field of network security. Additionally, the technology disclosed herein may provide technical improvements to the technological field of network security (e.g., including the technological field of network security within industrial systems and environments).

Accordingly, the technology disclosed herein may provide a cybersecurity solution designed to address, among other things, the technical problems and challenges in network security. For instance, in some configurations, the technology disclosed herein may combine advanced AI and ML techniques with real-time (or near real-time) network monitoring and adaptive threat response approaches. The technology disclosed herein provides technical improvements and advancements in network security. For example, the technology disclosed herein promotes network resilience, minimizes security risks, provides proactive protection for digital assets, and the like.

The technology disclosed herein provides systems and methods of providing dynamic network security for industrial systems. One configuration provides a method for controlling network security within an industrial system. The method may include monitoring, with a processing system including one or more electronic processors, network traffic at a first industrial device of the industrial system. The method may include determining, with the processing system, based on the network traffic, a first network security threat at the first industrial device using an artificial intelligence (AI) model trained to detect network security threats for the industrial system. The method may include controlling, with the processing system, execution of a mitigation operation responsive to the network security threat.

Another configuration provides a system for controlling network security within an industrial system. The system may include a first programmable logic controller (PLC) of the industrial system. The first PLC may be configured to monitor network traffic occurring at the first PLC. The first PLC may be configured to detect, based on the network traffic occurring at the first PLC, a first network security threat at the first PLC using an artificial intelligence (AI) model trained to detect network security threats for the first PLC. The first PLC may be configured to transmit, to a remote device, an electronic signal indicating a threat identifier for the first network security threat. The first PLC may be configured to control execution of a mitigation operation responsive to the first network security threat.

Yet another configuration provides a non-transitory, computer-readable medium storing instructions that, when executed by an electronic processor, perform a set of functions. The set of functions may include monitoring network traffic at a first industrial device of an industrial system. The set of functions may include determining, based on the network traffic, a first network security threat at the first industrial device using an artificial intelligence (AI) model trained to detect network security threats for the industrial system. The set of functions may include transmitting, to a remote device, an electronic signal indicating the first network security threat. The set of functions may include controlling execution of a mitigation operation responsive to the first network security threat.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Figure 1:
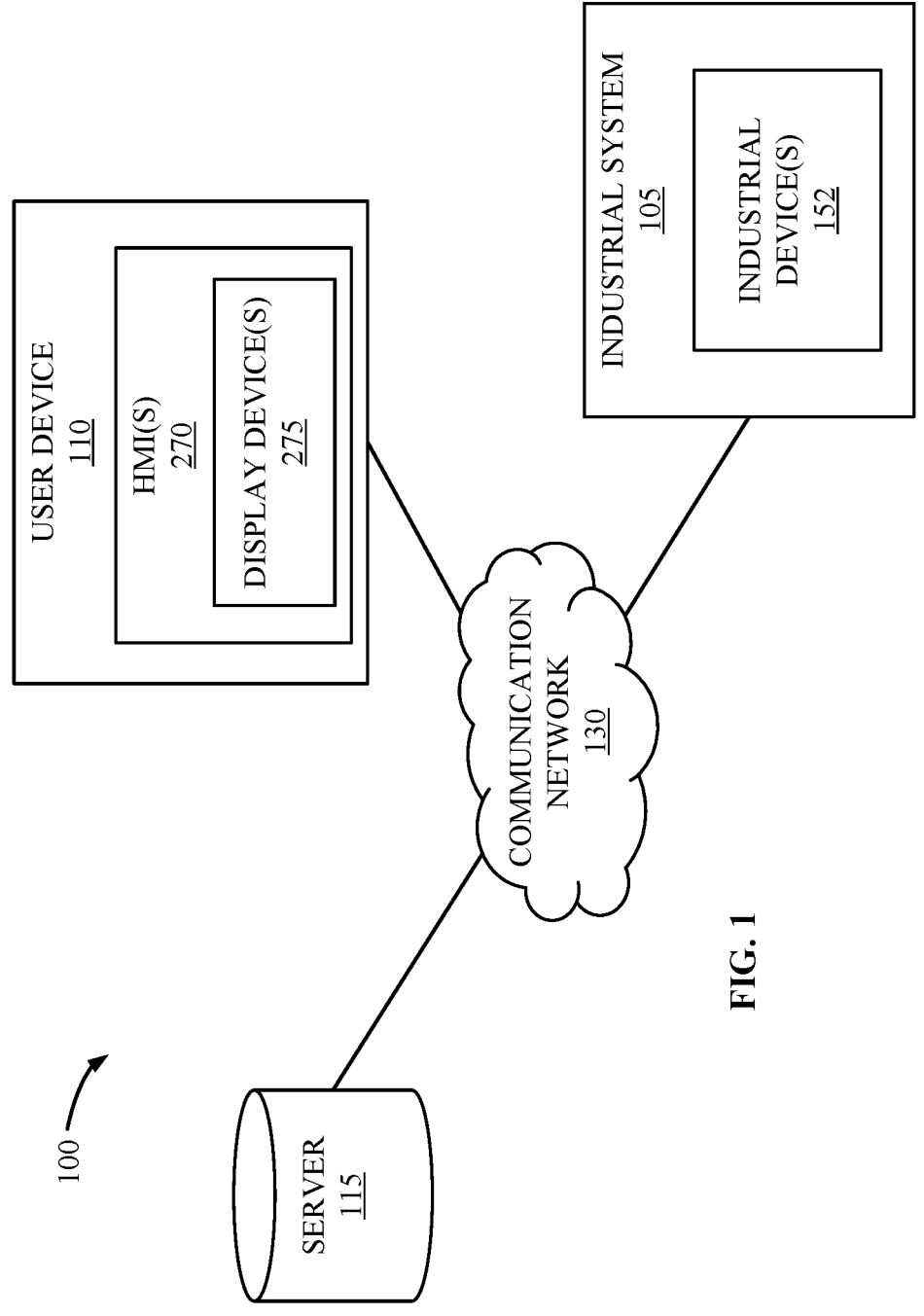
FIG. 1 schematically illustrates a system for controlling network security for industrial systems according to some configurations.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

As noted herein, the technology disclosed herein relates generally to industrial systems, and, more particularly, to dynamic network security for industrial systems using, e.g., artificial intelligence ("AI") enabled Ethernet. While the technology disclosed herein is described with respect to network security, and, in some instances, network security for industrial systems, the technology disclosed herein may be implemented or applied to other technologies, fields, use cases, industries, etc.

In some examples, the technology disclosed herein provides an AI-powered cybersecurity solution by facilitating dynamic reactive network security for industrial systems. Accordingly, the technology disclosed herein provides a technical solution to the technical problems stemming from the persistent and ever-evolving challenges in the field of network security. Additionally, the technology disclosed herein may provide technical improvements to the technological field of network security (e.g., including the technological field of network security within industrial systems and environments).

As one example, the technology disclosed herein may provide technical advantages and improvements with respect to adaptive threat detection. The technology disclosed herein may employ an AI-driven threat detection model that continuously learns and adapts to evolving network traffic patterns. This adaptability enables the technology disclosed herein to detect or identify emerging threats, including, e.g., zero-day vulnerabilities, which other systems may fail to detect, such as, e.g., signature-based systems or approaches. Accordingly, the technology disclosed herein may improve adaptive threat detection by enabling the detection of emerging threats, such as zero-day vulnerabilities, which other systems may fail to detect.

As another example, the technology disclosed herein may provide technical advantages and improvements with respect to real-time (or near real-time) monitoring of network traffic. The technology disclosed herein may provide real-time (or near real-time) monitoring of network traffic for an industrial system. Such monitoring may include network traffic between components internal to (or included within) the industrial system (also referred to herein as internal network traffic), network traffic involving at least one component or system external to the industrial system (also referred to herein as external network traffic), or a combination thereof. The real-time (or near real-time) monitoring of network traffic may decrease the amount of time it takes to detect threats, respond to or mitigate threats, or a combination thereof. For instance, the technology disclosed herein may enable immediate threat detection, response, mitigation, etc. In contrast, some approaches to monitoring network traffic rely on periodic scans or batch processing, leading to delayed threat detection, response, and mitigation. The longer it takes to detect, respond, and mitigate a threat, the more damage or impact that threat may have on the industrial system. As such, reducing delays in threat detection, response, and mitigation is advantageous. Accordingly, the technology disclosed herein may improve monitoring of network traffic by decreasing detection, response, and mitigation time (delays), which ultimately may reduce a potential impact that the threat has on the industrial system.

As yet another example, the technology disclosed herein may provide technical advantages and improvements by providing automated responses. While some approaches involve manual intervention, which may introduce delays and increased risk of human error, the technology disclosed herein may initiate an automated response to a potential threat, which may reduce the time-to-mitigation and, ultimately, minimize an impact of security incidents.

As yet another example, the technology disclosed herein may provide technical advantages and improvements by providing a collaborative threat intelligence approach. For instance, the technology disclosed herein may promote collaborative threat intelligence sharing among networked devices, allowing for a collective defense against threats (e.g., among multiple networked devices). For example, a networked device may share threat intelligence data or information with other networked devices. Other solutions operate in isolation, which hinders the ability to respond comprehensively to security incidents.

As yet another example, the technology disclosed herein may provide technical advantages and improvements by facilitating human oversight. The technology disclosed herein may maintain a role for human oversight, ensuring that security decisions align with organizational policies and goals. As such, the technology disclosed herein may strike a balance between automation and human control. Other solutions generally lack such a human oversight component, and, as a result, such solutions fail or lack to provide a balance between automation and human control.

As yet another example, the technology disclosed herein may provide technical advantages and improvements by allowing for adaptive network growth. The technology disclosed herein may scale with network growth, which enables implementation for modern, highly scalable network environments. Additionally, due to the scalability of the technology disclosed herein, the technology disclosed herein may handle increasing traffic volumes, adapt to changing network conditions, and the like.

As yet another example, the technology disclosed herein may provide technical advantages and improvements through a proactive defense approach. The AI-driven nature and functionality of the technology disclosed herein allows for proactive identification and mitigation of threats, and, in some instances, prior to a potential threat having an adverse impact. The technology disclosed herein provides a more robust defense against emerging and evolving threats than some solutions, which provide mere reactive security measures.

As yet another example, the technology disclosed herein may provide technical advantages and improvements by reducing false positives. For instance, in some configurations, the technology disclosed herein implements an AI model that may learn normal traffic patterns. In some configurations, the technology disclosed herein may detect or determine potential network threats based on the learned normal traffic patterns, as described in greater detail herein. In some configurations, the AI model may determine and provide a probability or confidence level (e.g., 0% to 100%) indicating how aligned present (e.g., real-time or near real-time) network traffic is with the learned normal traffic patterns. By determining and providing such a probability or confidence level, false positives may be reduced, as described in greater detail herein.

Accordingly, the technology disclosed herein may provide a cybersecurity solution designed to address, among other things, the technical problems and challenges in network security. For instance, in some configurations, the technology disclosed herein may combine advanced AI and ML techniques with real-time (or near real-time) network monitoring and adaptive threat response approaches. The technology disclosed herein provides technical improvements and advancements in network security. For example, the technology disclosed herein promotes network resilience, minimizes security risks, provides proactive protection for digital assets, and the like.

The technology disclosed herein provides methods and systems of providing dynamic network security for industrial systems. In some configurations, the technology disclosed herein may implement continuous learning. For instance, in some examples, the technology disclosed herein may implement an AI model. The AI model may establish a baseline of normal network behavior. The AI model may learn patterns of approved or legitimate network traffic and network activity over time. In some configurations, the AI model may adapt to changing network conditions. As network traffic is communicated, the AI model may analyze data associated with the network traffic (also referred to herein as "network data"). In some instances, the AI model may analyze the network data in real-time (or near real-time). The AI model may compare the network data, including, e.g., the observed traffic patterns, against the learned baseline, one or more known threat signatures, or a combination thereof. The AI model may detect deviations from normal network behavior. Such deviations may trigger further analysis.

In some configurations, when the technology disclosed herein identifies a potential threat, the technology disclosed herein may perform (or otherwise execute) a mitigation action. As described in greater detail herein, in some instances, a mitigation action may include a predefined action that mitigates a risk associated with the potential threat. For example, the technology disclosed herein may isolate an infected device, block a suspicious IP address, adjust a firewall rule to adjust exposure, etc.

Alternatively, or in addition, in some configurations, the technology disclosed herein may facilitate a collaborative defense against a detected threat. For instance, the technology disclosed herein may broadcast (or otherwise provide) information related to the detected threat (also referred to herein as "threat information"). As described in greater detail herein, threat information may include, e.g., information about the detected threat, the action(s) taken in response to the detected threat, the device(s) impacted by the detected threat, etc. Such a collaborative approach allows one or more components of the network (including, e.g., the entire network) to adapt and respond collectively to emerging threats.

In some configurations, the technology disclosed herein may provide an electronic message, such as a warning or an alert, to a user device of a network entity. As described in greater detail herein, the electronic message may include, e.g., the threat information, a recommended mitigation action, etc. A network entity may include, e.g., a network administrator, designated personnel, etc. The network entity may review the electronic message using the user device of the network entity. The network entity may interact with the electronic message by providing user input via the user device. For example, where the electronic message includes a recommended mitigation action, the network entity may review the electronic message and make an informed decision to authorize or decline the recommended mitigation action.

Accordingly, the technology disclosed herein may provide proactive threat detection and mitigation by proactively identifying and responding to a potential threat before the potential threat can cause harm to the network, which reduces the likelihood of data breaches, disruptions, downtime, cost, etc. The technology disclosed herein may provide adaptive defense by implementing an AI model that may continuously learn and adapt capabilities, which enables the technology disclosed herein to preemptively respond to and handle evolving threats, including, e.g., zero-day vulnerabilities. The technology disclosed herein may implement real-time (or near real-time) security by providing real-time (or near real-time) monitoring and response, which may minimize the impact of security incidents, enhance network resilience, or the like. The technology disclosed herein may facilitate collaborative security by implementing collaborative threat intelligence sharing, which may ensure that an entire network (or a portion thereof) benefits from the collective knowledge and experience of other networked devices.

FIG. 1 schematically illustrates an example system 100 for providing dynamic network security for industrial systems according to some configurations. In the illustrated example, the system 100 may include an industrial system 105, a user device 110, and a server 115. In some configurations, the system 100 includes fewer, additional, or different components in different configurations than illustrated in FIG. 1. As one example, the system 100 may include multiple industrial systems 105, multiple user devices 110, multiple servers 115, or a combination thereof. As another example, one or more components of the system 100 may be combined into a single device, such as, e.g., the user device 110 and the server 115, the server 115 and one or more of components of the industrial system 105, etc. Alternatively, or in addition, in some configurations, the user device 110, the server 115, or a combination thereof may be included as part of the industrial system 105 (e.g., as a component of the industrial system 105).

The industrial system 105, the user device 110, and the server 115 may communicate over one or more wired or wireless communication networks 130. Portions of the communication networks 130 may be implemented using a wide area network, such as the Internet, a local area network, such as BLUETOOTH® or WI-FI®, and combinations or derivatives thereof. Alternatively, or in addition, in some configurations, components of the system 100 may communicate directly as compared to through the communication network 130. Also, in some configurations, the components of the system 100 may communicate through one or more intermediary devices not illustrated in FIG. 1.

The industrial system 105 may be a manufacturing system, such as, e.g., an industrial automation system or the like. The industrial system 105 may be associated with (or located at) a facility or site. In some configurations, a facility or site may include multiple industrial systems 105 (e.g., a first industrial system, a second industrial system, a third industrial system, etc.). Accordingly, in some configurations, the industrial system 105 may be implemented at a facility. Alternatively, or in addition, in some configurations, the system 100 may include a first industrial system located at a first facility and a second industrial system located as a second facility different from the first facility. The industrial system 105 may be configured to perform one or more industrial processes, manufacturing processes, production processes, automation processes, or the like. In some configurations, the industrial system 105 may perform a production method that produces goods or products. As one example, the industrial system 105 may perform a vehicle manufacturing process to assemble or produce a vehicle (or various components thereof). As another example, the industrial system 105 may perform a food manufacturing process for making a food product. As yet another example, the industrial system 105 may perform a pharmaceutical manufacturing process for producing pharmaceuticals.

In the illustrated example, the industrial system 105 may include one or more industrial devices 152 (referred to herein collectively as "the industrial devices 152" and individually as "the industrial device 152"). The industrial device 152 may be a physical piece of equipment included in the industrial system 105. For example, an industrial device 152 may include a pump, a press, a conveyor, a valve, an industrial controller (e.g., a programmable logic controller ("PLC") and the like), a switch, a sensor, a server, a database, a human-machine interface ("HMI"), another piece of equipment that may be used in connection with an associated industrial process or application of the industrial system 105, or the like.

Figure 2:
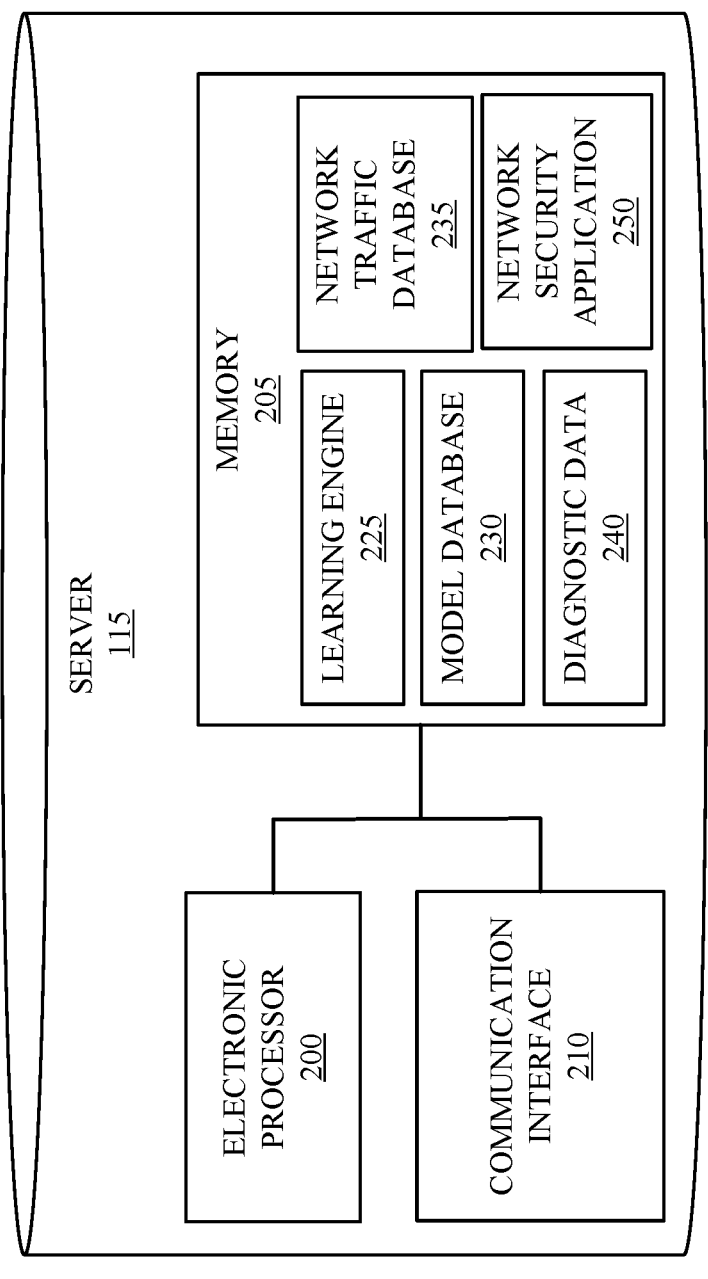
FIG. 2 schematically illustrates a server included in the system of FIG. 1 according to some configurations.

The system 100 may also include the server 115. The server 115 may be a computing device. As illustrated in FIG. 2, the server 115 may include an electronic processor 200, a memory 205, and a communication interface 210. The electronic processor 200, the memory 205, and the communication interface 210 may communicate wirelessly, over one or more communication lines or buses, or a combination thereof. The server 115 may include additional components than those illustrated in FIG. 2 in various configurations. The server 115 may also perform additional functionality other than the functionality described herein. Also, the functionality (or a portion thereof) described herein as being performed by the server 115 may be distributed among multiple devices (e.g., as part of a cloud service or cloud-computing environment), combined with another component of the system 100 (e.g., combined with the user device 110, another component of the system 100, or the like), or a combination thereof. For example, in some configurations, the functionality (or a portion thereof) described as being performed by the server 115 may be performed by one or more of the user device 110, the industrial device(s) 152, another component of the system 100 or industrial system 105, or a combination thereof.

The communication interface 210 may include a transceiver that communicates with the industrial system 105, the user device 110, or a combination thereof over the communication network 130 and, optionally, one or more other communication networks or connections. In some configurations, the communication interface 210 enables the server 115 to communicate with the industrial system 105, the user device 110, or a combination thereof over one or more wired or wireless connections. The electronic processor 200 may include a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions.

For example, as illustrated in FIG. 2, the memory 205 may store a learning engine 225 and a model database 230.

In some embodiments, the learning engine 225 develops one or more AI or machine learning models using one or more machine learning functions. Machine learning functions are generally functions that allow a computer application to learn without being explicitly programmed. In some examples, the learning engine 225 may develop an algorithm or model based on training data. For example, in some configurations, to perform unsupervised learning, the training data may include network traffic (also referred to herein as network traffic data) for the industrial system 105 (or component(s) thereof). As used herein, network traffic data may include data associated with network traffic occurring at a component of the industrial system 105, the network traffic itself, or a combination thereof. Alternatively, or in addition, to perform supervised learning, the training data may include example inputs and corresponding desired (for example, actual) outputs, and the learning engine progressively develops a model (for example, a classification model) that maps inputs to the outputs included in the training data. Machine learning performed by the learning engine 225 may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 225 to ingest, parse, and understand data and progressively refine models for data analytics, including, e.g., network security.

In some configurations, the models generated by the learning engine 225 may include one or more AI models, as described in greater detail herein. For instance, the AI model(s) generated by the learning engine 225 may be designed (or specifically trained to) perform various detection, classification, prediction, etc. functionality. In some configurations, an AI model generated by the learning engine 225 may be specific to a particular component of the industrial system 105 (e.g., the industrial device 152). In such configurations, the learning engine 225 may develop or train an AI model for a particular industrial device 152 using network traffic data for the particular industrial device 152 (e.g., as training data). For instance, when developing an AI model for the industrial device 152, network traffic at the industrial device 152 (or network traffic data thereof) may be monitored and utilized as training data for developing an AI model specific to the industrial device 152. The AI model specific to the industrial device 152 may learn, based on the network traffic data for the industrial device 152, normal network traffic or behavior for the industrial device 152. When a training process is completed, the AI model may be utilized for threat detection, threat mitigation, etc. for the industrial system 105, as described in greater detail herein. For instance, the AI model may receive (or ingest) network traffic data while the industrial system 105 is performing an industrial process and detect a potential threat, as described in greater detail herein.

The AI models generated by the learning engine 225 may be stored in the model database 230. As illustrated in FIG. 2, the model database 230 is included in the memory 205 of the server 115. However, in some configurations, the model database 230 (or a portion thereof) is included in a separate device accessible by the server 115 (included in the server 115 or external to the server 115). As described in greater detail herein, in some examples, one or more of the AI models may be stored locally at a corresponding component of the industrial system 105. For example, a first AI model specifically trained for a first industrial device may be stored locally at the first industrial device and a second AI model specifically trained for a second industrial device may be stored locally at the second industrial device.

As illustrated in FIG. 2, the memory 205 may also include a network traffic database 235. The network traffic database 235 may include data or information relating to network traffic or behavior. In some instances, the network traffic database 235 may include a dataset of network traffic data for each industrial device 152 of the industrial system 105. For example, the network traffic database 235 may include a first dataset of network traffic data for a first industrial device, a second dataset of network traffic data for a second industrial device, etc. In some instances, the network traffic data (or dataset) of the network traffic database 235 may represent or describe normal network traffic or patterns, such as, e.g., normal network traffic for a corresponding industrial device 152. Accordingly, in some instances, the network traffic database 235 may store historical or previous network traffic data. Alternatively, or in addition, in some configurations, the network traffic database 235 may store present network traffic data (e.g., real-time (or near real-time) network traffic). As noted herein, in some instances, network traffic data may be utilized as training data for developing one or more AI models. Accordingly, in some configurations, the network traffic database 235 may include one or more sets of training data accessible by the learning engine 225.

As illustrated in FIG. 2, the network traffic database 235 is included in the memory 205 of the server 115. However, in some configurations, the network traffic database 235 (or a portion of the network traffic data stored therein), may be included in a separate device accessible by the server 115 (included in the server 115 or external to the server 115). As described in greater detail herein, in some examples, the network traffic database 235 (or a portion of the network traffic data stored therein) may be stored locally at the industrial device 152. For example, network traffic data related to network traffic for a first industrial device may be stored locally at the first industrial device and network traffic data related to network traffic for a second industrial device may be stored locally at the second industrial device.

The memory 205 may also include diagnostic data 240. The diagnostic data 240 may include a threat identifier for a detected threat. As used herein, a threat identifier may include information or data that enables the identification of the detected threat. For instance, a threat identifier may identify a device from which the detected threat originated from, such as, e.g., an IP address of a device, a device identification, etc. Alternatively, or in addition, a threat identifier may identify a user from which the detected threat originated from, such as, e.g., a user identity (e.g., a first name, a last name, or the like), an identification number (e.g., an employee number, a badge number, a visitor pass number, or the like), user login credentials, or the like.

Alternatively, or in addition, the diagnostic data 240 may include information or data related to a detected threat, the threat identifier, or a combination thereof. For instance, the diagnostic data 240 may include a threat type, an action associated with the detected threat (e.g., an action attempted by the detected threat, an action performed by the detected threat, etc.), an access point (e.g., an access location or component of the industrial system 105 from which the detected threat originated from), detecting device information (e.g., an identification of a component of the industrial system 105 that detected the detected threat), or the like.

As one example, the diagnostic data 240 may include a threat identifier list identifying entities or devices classified as threats (e.g., either suspected as potential threats or confirmed as actual threats). Accordingly, in some configurations, the diagnostic data 240 may include a "bad actor" list. As another example, the diagnostic data 240 may include the industrial device 152 from which the detected threat originated from (or was detected by).

As illustrated in FIG. 2, the diagnostic data 240 is included in the memory 205 of the server 115. However, in some configurations, the diagnostic data 240 (or a portion thereof), may be included in a separate device accessible by the server 115 (included in the server 115 or external to the server 115). As described in greater detail herein, in some examples, the diagnostic data 240 (or a portion thereof) may be stored locally at one or more of the industrial devices 152. For example, in some configurations, each of the industrial devices 152 may store and maintain the diagnostic data 240 (e.g., a local copy of the diagnostic data 240). As described in greater detail herein, in such configurations, revisions or changes to the diagnostic data 240 may be broadcasted (or otherwise provided) to one or more of the industrial devices 152, such that each locally stored copy of the diagnostic data 240 is updated to reflect any revisions or changes (e.g., an updated "bad actor" list). As one example, when a threat is detected at an industrial device, a threat identifier for that threat may be shared with (e.g., transmitted to or otherwise provided to) one or more other industrial devices.

In some configurations, the memory 205 may include a network security application 250 (referred to herein as "the application 250"). The application 250 may be a software application executable by the electronic processor 200 in the example illustrated and as specifically discussed below, although a similarly purposed module may be implemented in other ways in other examples. The electronic processor 200 may execute the application 250 to provide a network security service or functionality for the industrial system 105 (or one or more industrial devices 152 therein), as described in greater detail herein. In some configurations, the application 250 may be a web-browser application that enables access and interaction with a network security platform, such as, e.g., a network security platform associated with the server 115 (e.g., where the network security platform is a web-based service). Alternatively, or in addition, the application 250 may be a dedicated software application that enables access and interaction with a network security platform, such as, e.g., a network security platform associated with (or hosted by) the server 115. Accordingly, in some configurations, the application 250 may function as a software application that enables access to a network security platform or service provided by the server 115.

As illustrated in FIG. 2, the application 250 is included in the memory 205 of the server 115. However, in some configurations, the application 250 may be included in a separate device accessible by the server 115 (included in the server 115 or external to the server 115). For example, the application 250 (or a portion thereof) may be stored at the user device 110, the industrial device(s) 152, or the like. As described in greater detail herein, in some examples, the application 250 may be stored locally at one or more of the industrial devices 152. For example, in some configurations, each of the industrial devices 152 may store and execute the application 250 (e.g., a local copy of the application 250 executable locally by each of the industrial devices 152).

Returning to FIG. 1, the system 100 may include the user device 110. The user device 110 may also include a computing device, such as a desktop computer, a laptop computer, a tablet computer, a terminal, a smart telephone, a smart television, a smart wearable, or another suitable computing device that interfaces with a user. In some examples, the user device 110 may be included as a component of the industrial system 105, such as, e.g., a HMI of the industrial system 105. However, in some configurations, such as the configuration illustrated in FIG. 1, the user device 110 may be separate or remote from the industrial system 105.

The user device 110 may be used by a user in relation to network security detection and mitigation, as described herein. For instance, a user may use the user device 110 to interact with information associated with the industrial system 105, such as, e.g., network security related information for the industrial system 105, as described in greater detail herein. In some configurations, a user may use the user device 110 to perform threat detection, threat mitigation, or a combination thereof for the industrial system 105. Alternatively, or in addition, in some configurations, a user may use the user device 110 to design and train AI model(s), as described in greater detail herein. For instance, in some configurations, a user may initiate, using the user device 110, a training process or mode for one or more of the industrial devices 152, such as, e.g., when the industrial device 152 is a new industrial device for the industrial system 105, when a configuration of the industrial system 105 is updated or changed, etc. Accordingly, in some configurations, a user may initiate a training process to train or retrain AI model(s) for one or more of the industrial devices 152. Alternatively, or in addition, in some configurations, a user may initiate, using the user device 110, a security detection mode to monitor for and detect potential threats for one or more of the industrial devices 152, such as, e.g., upon completion of a training (or retraining) process.

Although not illustrated in FIG. 1, the user device 110 may include similar components as the server 115, such as electronic processor (e.g., a microprocessor, an application-specific integrated circuit (ASIC), or another suitable electronic device), a memory (e.g., a non-transitory, computer-readable storage medium), a communication interface, such as a transceiver, for communicating over the communication network 130 and, optionally, one or more additional communication networks or connections, and one or more human machine interfaces. For example, to communicate with the server 115, the industrial system 105 (or one or more industrial devices 152 thereof), the user device 110 may store a browser application or a dedicated software application executable by an electronic processor. In some configurations, the user device 110 includes additional, fewer, or different components than the server 115.

As illustrated in FIG. 1, in some configurations, the user device 110 may include the HMI 270 for interacting with a user. The HMI 270 may include one or more input devices, one or more output devices, or a combination thereof. Accordingly, in some configurations, the HMI 270 allows a user to interact with (e.g., provide input to and receive output from) the user device 110. For example, the HMI 270 may include a keyboard, a cursor-control device (e.g., a mouse), a touch screen, a scroll ball, a mechanical button, a display device (e.g., a liquid crystal display ("LCD")), a printer, a speaker, a microphone, another type of input device, another type of output device, or a combination thereof. As illustrated in FIG. 1, in some configurations, the HMI 270 includes a display device 275. The display device 275 may be included in the same housing as the user device 110 or may communicate with the user device 110 over one or more wired or wireless connections. For example, in some configurations, the display device 275 is a touchscreen included in a laptop computer or a tablet computer. In other configurations, the display device 275 is a monitor, a television, or a projector coupled to a terminal, desktop computer, or the like via one or more cables.

As noted herein, the functionality (or a portion thereof) described herein as being performed by the server 115 may be performed by another device of the system 100, distributed among multiple devices of the system 100, combined with another component of the system 100, or a combination thereof. For example, in some configurations, the functionality (or a portion thereof) described as being performed by the server 115 may be performed by one or more of the user device 110, the industrial device(s) 152, another component of the system 100 or industrial system 105, or a combination thereof.

Figure 3:
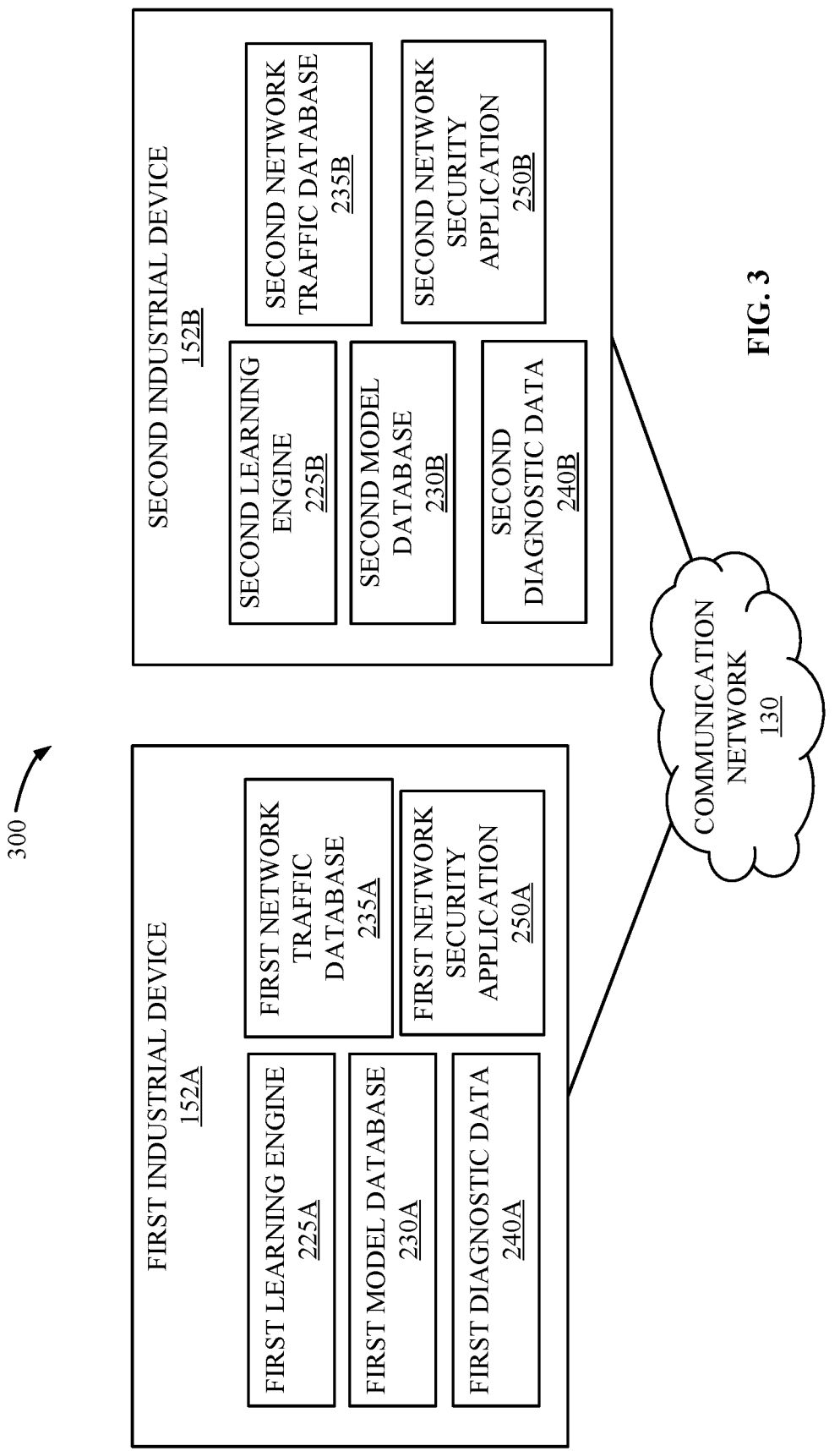
FIG. 3 schematically illustrates an example system configuration where the functionality of the server is performed by one or more of the industrial devices of the industrial system according to some configurations.

For example, FIG. 3 illustrates an example system configuration 300 where the functionality of the server 115 is performed by one or more of the industrial devices 152 of the industrial system 105 according to some configurations. In such a configuration, the server 115 may be omitted from the system 100 of FIG. 1. As illustrated in FIG. 3, the system configuration 300 includes two industrial devices 152, including a first industrial device 152A and a second industrial device 152B. Although not illustrated in FIG. 3, the first industrial device 152A, the second industrial device 152B, or a combination thereof may include similar components as the server 115, such as electronic processor (e.g., a microprocessor, an application-specific integrated circuit (ASIC), or another suitable electronic device), a memory (e.g., a non-transitory, computer-readable storage medium), a communication interface, such as a transceiver, for communicating over the communication network 130 and, optionally, one or more additional communication networks or connections, and one or more human machine interfaces.

As illustrated in FIG. 3, in some configurations, the first industrial device 152A, the second industrial device 152B, or a combination thereof may include the learning engine 225, the model database 230, the diagnostic data 240, the network traffic database 235, the application 250, or a combination thereof. Accordingly, in some examples, one or more of the industrial devices 152 (e.g., the first industrial device 152A, the second industrial device 152B, etc.) may store, such as, e.g., in a memory of the industrial device 152, the learning engine 225, the model database 230, the diagnostic data 240, the network traffic database 235, the application 250, or a combination thereof.

For instance, as illustrated in FIG. 3, the first industrial device 152A may include a first learning engine 225A, a first model database 230A, a first diagnostic data 240A, a first network traffic database 235A, a first application 250A, or a combination thereof and the second industrial device 152B may include a second learning engine 225B, a second model database 230B, a second diagnostic data 240B, a second network traffic database 235B, a second application 250B, or a combination thereof.

In such configurations, one or more components of the industrial device 152 may be specific to that industrial device 152. As one example, with respect to the first industrial device 152A, the first model database 230A may store one or more AI models specifically trained to detect network security threats for the first industrial device 152A. For example, the first learning engine 225A may train an AI model using network traffic at the first industrial device 152A as training data such that the AI model learns normal network traffic or behavior for the first industrial device 152A, such that, when the AI model is implemented to detect network security threats for the first industrial device 152A, the AI model can compare presently occurring network traffic (e.g., in real time (or near real-time) at the first industrial device 152A to the learned normal network traffic or behavior for the first industrial device 152A.

As another example, with respect to the second industrial device 152B, the second model database 230B may store one or more AI models specifically trained to detect network security threats for the second industrial device 152B. For example, the second learning engine 225B of the second industrial device 152B may train an AI model using network traffic at the second industrial device 152B as training data such that the AI model learns normal network traffic or behavior for the second industrial device 152B, such that, when the AI model is implemented to detect network security threats for the second industrial device 152B, the AI model can compare presently occurring network traffic (e.g., in real time (or near real-time) at the second industrial device 152B to the learned normal network traffic or behavior for the second industrial device 152B.

Figure 4:
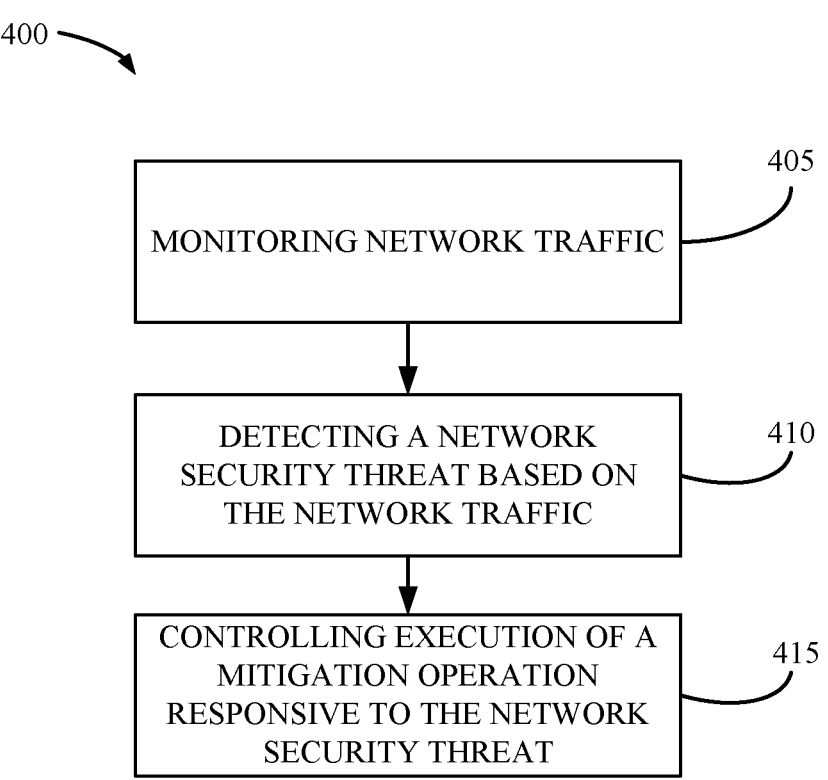
FIG. 4 is a flowchart illustrating a method for controlling network security for industrial systems according to some configurations.

FIG. 4 is a flowchart illustrating a method 400 of providing network security for the industrial system 105 (or one or more industrial devices 152 therein) according to some configurations. The method 400 is described as being performed by the first industrial device 152A of FIG. 3 and, in particular, one or more electronic processors of the first industrial device 152A of FIG. 3. However, as noted herein, the functionality described with respect to the method 400 may be performed by other devices, such as the server 115, the user device 110, another industrial device 152 of the industrial system 105 (e.g., the second industrial device 152B of FIG. 3), another component included in the industrial system 105, or a combination thereof, distributed among a plurality of devices, such as a plurality of servers included in a cloud service, or a combination thereof.

As illustrated in FIG. 4, the first industrial device 152A may monitor network traffic occurring at the first industrial device 152A (at block 405). As noted herein, industrial systems (e.g., the industrial system 105) may facilitate execution of an industrial process to coordinate and control industrial devices 152 (e.g., the first industrial device 152A, the second industrial device 152B, etc.) to perform at least a portion of the industrial process. Execution of an industrial process may include communication between components of the industrial system 105 (e.g., as network traffic). As one example, the first industrial device 152A and the second industrial device 152B may communicate via the communication network 130, as illustrated in the example of FIG. 3.

In some configurations, the first industrial device 152A may monitor network traffic while the industrial system 105 is executing an industrial process. As such, in some configurations, the first industrial device 152A monitors network traffic in real-time (or near real-time) as the first industrial device 152A communicates with another component of the industrial system 105 (e.g., another industrial device 152, such as the second industrial device 152B). Alternatively, or in addition, in some instances, the first industrial device 152A may periodically or intermittently monitor network traffic.

The first industrial device 152A may monitor the network traffic to detect a network security threat or incident at the first industrial device 152A (at block 410). The first industrial device 152A may determine whether a network security threat is present based on the network traffic. The first industrial device 152A may detect the network security threat at the first industrial device 152A when the first industrial device 152A determines that a network security threat or incident has occurred or is presently occurring at the industrial device.

In some configurations, the first industrial device 152A may detect the network security threat using an AI model trained to detect network security threats for the first industrial device 152A. For instance, the first industrial device 152A may utilize an AI model stored in the first model database 230A to detect network security threat(s) based on the network traffic at the first industrial device 152A (e.g., as recited at block 405).

For instance, the first industrial device 152A may access an AI model from the first model database 230A and provide the network traffic received at block 405 as an input to the AI model. In some configurations, the AI model may analyze the network traffic to determine whether the network traffic indicates a potential network security threat or incident. In some examples, the AI model may compare the network traffic (or a portion thereof) to known network traffic patterns (e.g., normal or expected network traffic or behavior) for the first industrial device 152A. When the network traffic does not align with the known network traffic patterns, the AI model determine that the network traffic indicates that a network security threat is present (e.g., has occurred or is occurring). Alternatively, when the network traffic aligns with the known network traffic patterns, the AI model may determine that the network traffic indicates that a network security threat is not present (e.g., the network traffic received at block 405 represents normal or expected network traffic or behavior for the first industrial device 152A).

Alternatively, or in addition, in some configurations, the first industrial device 152A may detect a network security threat based on diagnostic data (e.g., the first diagnostic data 240A). For instance, when the network traffic includes an entity identifier that the diagnostic data designates as a threat, the first industrial device 152A may detect a network security threat or incident. Accordingly, in some configurations, the first industrial device 152A may access the first diagnostic data 240A, compare one or more parameters of the network traffic received at block 405, and detect a network security threat based on the comparison. As one example, when the diagnostic data includes a first entity identifier associated with a previously detected network security threat and the first industrial device 152A determines that the network traffic received at block 405 (or a portion thereof) includes network traffic associated with the first entity identifier, the first industrial device 152A may detect (or determine) a network security threat.

As noted herein, in some configurations, the diagnostic data may include previously detected (or confirmed) network security threats for the industrial system 105 (or industrial devices 152 thereof). For instance, as an industrial device 152 detects a network security threat, that industrial device 152 may broadcast (or otherwise provide) a notification (e.g., an electronic signal or signals) indicating the network security threat, such as, e.g., an entity identifier associated with that network security threat or additional information associated with that network security threat. As such, each industrial device 152 may maintain and manage a local copy of the diagnostic data.

Accordingly, in some configurations, the first industrial device 152A may receive an electronic message or signal(s) from another industrial device 152 of the industrial system 105 (e.g., the second industrial device 152B). The electronic message or signal(s) may identify or describe the network security threat detected at the other industrial device 152

(e.g., the second industrial device 152B). For example, the electronic message or signal(s) may include diagnostic data or information for the network security threat detected at that other industrial device 152, including, e.g., an entity identifier identifying an entity or device associated with an origination of that network security threat detected at the other industrial device 152. When the first industrial device 152A receives the electronic message or signal(s) including the (updated or new) diagnostic data, the first industrial device 152A may update or add that diagnostic data to its local copy of the diagnostic data (e.g., the first diagnostic data 240A).

As illustrated in FIG. 4, the first industrial device 152A may control execution of a mitigation operation responsive to the network security threat (at block 415). A mitigation operation may mitigate, remediate, or eliminate the network security threat. In some configurations, the first industrial device 152A automatically implements the mitigation operation when a network security threat is detected. In some configurations, the first industrial device 152A may control execution of multiple mitigation operations responsive to the network security threat.

In some configurations, the mitigation operation may include generating and transmitting an alert or message (e.g., an electronic message or signal(s)) indicating an occurrence of the network security threat at the first industrial device 152A. The alert may include information associated with the network security threat, including, e.g., diagnostic data, an entity identifier, etc. (as described in greater detail herein). In some instances, the alert may be transmitted to a remote device, such as, e.g., another industrial device (e.g., the second industrial device 152B), the user device 110, another component of the industrial system 105, another component of the system 100, or a combination thereof.

In some examples, the first industrial device 152A may transmit the alert to another industrial device 152 (e.g., the second industrial device 152B). Responsive to receiving the alert, the second industrial device 152B may update its local copy of the diagnostic data 240 (e.g., the second diagnostic data 240B of FIG. 3) such that, e.g., the second diagnostic data 240B includes the network security threat (or diagnostic data associated therewith).

In some examples, the first industrial device 152A may transmit the alert to the user device 110 (via, e.g., the communication network 130). Responsive to receiving the alert, the user device 110 may provide the alert to a user of the user device 110 (e.g., display the alert and associated information or data via the display device 275). In some configurations, the alert may include a threat identifier for the network security threat, diagnostic data associated with the network security threat, a mitigation operation, a status of the mitigation operation (e.g., performed, pending approval, etc.), etc. Alternatively, or in addition, in some configurations, the alert may request confirmation of the network security threat. For instance, the alert may request that a user confirm whether the network security threat is a valid (or actual) threat to the industrial system 105 (or industrial devices 152 thereof). Alternatively, or in addition, in some configurations, the alert may request confirmation of a mitigation operation, such as, e.g., when the mitigation operation is pending approval from a user prior to execution.

In some configurations, the first industrial device 152A may control execution of the mitigation operation by isolating the first industrial device 152A from other components of the industrial system 105, such as, e.g., the second industrial device 152B. In some configurations, the first industrial device 152A may isolate itself by preventing interactions with other components of the industrial system 105. In some instances, such isolation may prevent interactions that are unrelated to the network security threat. Alternatively, or in addition, in some configurations, the first industrial device 152A may control execution of the migration operation by blocking network traffic associated with the network security threat. For instance, the first industrial device 152A may prevent any network traffic associated with the network security threat from being transmitted within the industrial system 105.

In some configurations, the technology disclosed herein may be implemented using a probability level (or confidence level). A probability level may indicate a confidence associated with whether the detected network threat is actually a network threat or a false positive (e.g., not an actual network threat). The probability level may be a percentage (e.g., 0%-100%), where a low percentage (e.g., 40%) indicates a low confidence level that the detected network threat is actually a network threat while a high percentage (e.g., 90%) indicates a high confidence level that the detected network threat is actually a network threat. In some configurations, the probability level may be determined based on a comparison between a learned normal traffic pattern for the industrial device 152 and a present (e.g., real-time or near real-time) traffic pattern for the industrial device 152.

For example, the industrial device 152 (e.g., an electronic processor thereof executing the AI model) may compare a learned network traffic pattern with a present network traffic pattern. Such a comparison may determine how similar or aligned present network traffic is with the learned network traffic pattern for a corresponding industrial device 152. When the comparison indicates that the present network traffic pattern aligns with the learned network traffic pattern, the industrial device 152 may determine that the present network traffic pattern algins with normal network traffic for the industrial device 152, and, ultimately, may not detect a potential network threat based on the present network traffic. When the comparison indicates that the present network traffic pattern does not align with the learned network traffic pattern, the industrial device 152 may determine that the present network traffic pattern does not align with normal network traffic for the industrial device 152, and, ultimately, may detect a potential network threat based on the present network traffic.

In some configurations, the industrial device 152 may determine how similar or aligned present network traffic is with the learned network traffic pattern using one or more alignment ranges. An alignment range may represent an acceptable deviation from the learned network traffic pattern (e.g., an acceptable deviation from normal traffic patterns). When the comparison indicates that the present network traffic pattern deviates from the learned network traffic pattern, but the deviation is within the alignment range (e.g., is an acceptable deviation), the industrial device 152 may determine that the present network traffic pattern algins with normal network traffic for the industrial device 152, and, ultimately, may not detect a potential network threat based on the present network traffic. When the comparison indicates that the present network traffic pattern deviates from the learned network traffic pattern, and the deviation is outside of the alignment range (e.g., not an acceptable deviation), the industrial device 152 may determine that the present network traffic pattern does not algins with normal network traffic for the industrial device 152, and, ultimately, may detect a potential network threat based on the present network traffic.

In some instances, the alignment range may be dynamic or adjustable such that a sensitivity of the threat detection may be customized or tailored. For instance, in some configurations, a user may interact with the user device 110 (or a user interface or graphical user interface thereof) to set or adjust one or more of the alignment ranges. For instance, when the user wants a more sensitive approach to threat detection, the user may define an alignment range that is smaller (e.g., decrease a current alignment range), such that a smaller deviation from the learned network traffic pattern is allowed before detecting a network threat. Similarly, when the user wants a less sensitive approach to threat detection, the user may define an alignment range that is grater (e.g., increase a current alignment range), such that a greater deviation from the learned network traffic pattern is allowed before detecting a network threat.

In some configurations, the technology disclosed herein may utilize the probability level to determine whether to execute the mitigation operation. Alternatively, or in addition, in some configurations, the technology disclosed herein may utilize the probability level to determine which mitigation operation to execute. Accordingly, in some configurations, the technology disclosed herein may implement one or more threat level or tiers. A detected network threat may be classified as a specific threat level based on a corresponding probability level of the detected network threat. In some configurations, each threat level may be associated with or mapped to a specific mitigation operation (or set of mitigation operations). For example, when a probability level for a detected network threat falls within a first range of probability levels (e.g., between 80% and 100%), the technology disclosed herein may classify the detected threat as a first level network threat. When the probability level for the detected threat falls within a second range of probability levels different from the first range of probability levels (e.g., less than 80%), the technology disclosed herein may classify the detected network threat as a second level network threat. Following this example, the technology disclosed herein may control execution of a set of mitigation operations based on whether the detected threat is classified as a first level network threat or a second level network threat. When the detected threat is classified as a first level network threat, the technology disclosed herein may control execution of a first set of mitigation operations. However, when the detected threat is classified as a second level network threat, the technology disclosed herein may control execution of a second set of mitigation operations (different from the first set of mitigation operations).

In some configurations, implementation of the threat levels may be customized or tailored based on user input or specifications. For instance, a user may define the threat levels, the corresponding probability levels or ranges, the corresponding set of mitigation operations, or a combination thereof. For instance, a user may interact with the user device 110 (or a user interface or graphical user interface thereof) to set or adjust one or more of the threat levels, the corresponding probability levels or ranges, the corresponding set of mitigation operations, or a combination thereof.

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for controlling network security within an industrial system, the method comprising:

monitoring, with a processing system including one or more electronic processors, during performance of an industrial process with the industrial system, network traffic at a first industrial device of the industrial system, wherein the first industrial device is a programmable logic controller (PLC) configured to control at least a portion of the industrial process;

receiving, with the processing system, an electronic message from a second industrial device of the industrial system, the electronic message identifying a second network security threat detected at the second industrial device, wherein the electronic message includes a threat identifier for the second network security threat that identifies at least one of an entity or a device associated with an origination of the second network security threat;

determining, with the processing system, based on the network traffic and the second network security threat detected at the second industrial device, a first network security threat at the first industrial device using an artificial intelligence (AI) model trained to detect network security threats for the industrial system; and controlling, with the processing system, execution of a mitigation operation responsive to the first network security threat.

2. The method of claim 1, wherein monitoring the network traffic at the first industrial device includes monitoring the network traffic at the first industrial device in real-time.

3. The method of claim 1, further comprising:

receiving the network traffic associated with the first industrial device; and training the AI model to detect network security threats at the first industrial device, wherein the network traffic is used as training data.

4. The method of claim 3, wherein training the AI model includes training the AI model using unsupervised learning.

5. The method of claim 1, wherein controlling execution of the mitigation operation includes transmitting, to a third second-industrial device of the industrial system, an electronic signal including information associated with the first network security threat.

6. The method of claim 5, wherein transmitting the electronic signal includes transmitting a threat identifier for the first network security threat.

7. The method of claim 1, wherein controlling execution of the mitigation operation includes isolating the first industrial device from a third industrial device of the industrial system.

8. The method of claim 1, wherein controlling execution of the mitigation operation includes blocking network traffic associated with the first network security threat.

9. The method of claim 1, wherein controlling execution of the mitigation operation includes transmitting an alert to a user device for display to a network administrative entity of the industrial system.

10. The method of claim 9, further comprising:

receiving, from the user device, a response to the alert, wherein the response confirms whether the first network security threat is an actual threat to the industrial system.

11. A non-transitory, computer-readable medium storing instructions that, when executed by an electronic processor, perform a set of functions, the set of functions comprising:

monitoring network traffic at a first industrial device of an industrial system;

receiving an electronic message from a second industrial device of the industrial system, the electronic message identifying a second network security threat detected at the second industrial device, wherein the electronic message includes a threat identifier for the second network security threat that identifies at least one of an entity or a device associated with an origination of the second network security threat;

determining, based on the network traffic and the second network security threat detected at the second industrial device, a first network security threat at the first industrial device using an artificial intelligence (AI) model trained to detect network security threats for the industrial system;

transmitting, to a remote device, an electronic signal indicating the first network security threat; and controlling execution of a mitigation operation responsive to the first network security threat.

12. The computer readable medium of claim 11, wherein the set of functions further includes:

receiving the network traffic at the first industrial device associated with the first industrial device; and training, via unsupervised learning, the AI model to detect network security threats at the first industrial device, wherein the network traffic is used as training data.

13. The computer readable medium of claim 11, wherein the set of functions further comprising:

accessing diagnostic data identifying previously detected network security threats of the industrial system, wherein the first network security threat is determined based on the diagnostic data.

14. The computer readable medium of claim 11, wherein transmitting the electronic signal indicating the first network security threat includes transmitting an alert indicating an occurrence of the first network security threat, wherein the alert includes a threat identifier for the first network security threat and, wherein the alert requests confirmation of the first network security threat.

15. A system for controlling network security within an industrial system, the system comprising:

a first programmable logic controller (PLC) of the industrial system, wherein the first PLC is configured to:

monitor network traffic occurring at the first PLC;

receive an electronic message from a second industrial device of the industrial system, the electronic message identifying a second network security threat detected at the second industrial device, wherein the electronic message includes a threat identifier for the second network security threat that identifies at least one of an entity or a device associated with an origination of the second network security threat;

detect, based on the network traffic occurring at the first PLC and the second network security threat detected at the second industrial device, a first network security threat at the first PLC using an artificial intelligence (AI) model trained to detect network security threats for the first PLC;

and control execution of a mitigation operation responsive to the first network security threat.

16. The system of claim 15, wherein the first PLC is configured to update a local copy of diagnostic information for the industrial system to include the second network security threat as a previously detected network security threat of the industrial system.

17. The system of claim 15, wherein the first PLC is configured to transmit, to a remote device, an electronic signal indicating a corresponding threat identifier for the first network security threat, wherein the corresponding threat identifier identifies the first PLC, wherein the remote device is a user device of a network administrator for the industrial system and, responsive to receiving the electronic signal, the user device generates an alert to the network administrator, wherein the alert notifies the network administrator of an occurrence of the first network security threat and requests confirmation that the first network security threat does pose a network security threat to the industrial system.

* * * * *